United States Patent
Wilsher et al.

(10) Patent No.: US 8,494,930 B2
(45) Date of Patent: Jul. 23, 2013

(54) PAY FOR USE AND ANTI COUNTERFEIT SYSTEM AND METHOD FOR INK CARTRIDGES AND OTHER CONSUMABLES

(75) Inventors: Michael John Wilsher, Letchworth (GB); Ian Burdon, Letchworth (GB)

(73) Assignee: Xerox Corporation, Norwalk, CT (US)

( * ) Notice: Subject to any disclaimer, the term of this patent is extended or adjusted under 35 U.S.C. 154(b) by 461 days.

(21) Appl. No.: 12/578,815

(22) Filed: Oct. 14, 2009

(65) Prior Publication Data

US 2011/0087570 A1    Apr. 14, 2011

(51) Int. Cl.
*G07B 17/00* (2006.01)
*G07F 19/00* (2006.01)
*G06Q 40/00* (2012.01)
*G06Q 30/04* (2012.01)
*G06Q 20/10* (2012.01)

(52) U.S. Cl.
CPC .............. *G06Q 40/10* (2013.01); *G06Q 30/04* (2013.01); *G06Q 40/00* (2013.01); *G06Q 20/102* (2013.01)
USPC ................. 705/34; 705/1.1; 705/30; 705/40; 358/1.14; 358/1.15

(58) Field of Classification Search
CPC ......... G06Q 40/10; G06Q 40/02; G06Q 40/00; G06Q 20/102; G06Q 30/04
USPC ................. 705/7.12, 30, 14.1, 35, 7.11, 26.1, 705/26.8, 28, 29, 40; 358/1.15, 1.14; 347/85; 399/8, 12; 514/770, 778
See application file for complete search history.

(56) References Cited

U.S. PATENT DOCUMENTS

| | | | | |
|---|---|---|---|---|
| 5,305,199 A | * | 4/1994 | LoBiondo et al. | 705/28 |
| 6,012,925 A | * | 1/2000 | Kelly et al. | 434/107 |
| 6,092,726 A | * | 7/2000 | Toussant et al. | 235/383 |
| 7,231,166 B2 | * | 6/2007 | Miyaji | 399/109 |
| 7,663,770 B2 | * | 2/2010 | Campbell et al. | 358/1.15 |
| 7,672,878 B2 | * | 3/2010 | Katou et al. | 705/28 |
| 7,840,461 B2 | * | 11/2010 | Raguseo et al. | 705/35 |
| 7,856,400 B2 | * | 12/2010 | Knodt | 705/40 |
| 8,032,401 B2 | * | 10/2011 | Choubey | 705/7.11 |
| 8,055,537 B2 | * | 11/2011 | Snyder et al. | 705/14.1 |
| 2002/0007422 A1 | * | 1/2002 | Bennett | 709/246 |
| 2004/0066532 A1 | * | 4/2004 | Matsugi | 358/1.15 |
| 2004/0067084 A1 | * | 4/2004 | Zerza et al. | 400/76 |
| 2004/0111326 A1 | * | 6/2004 | Rock et al. | 705/26 |
| 2004/0215533 A1 | * | 10/2004 | Doeberl et al. | 705/30 |
| 2004/0249655 A1 | * | 12/2004 | Doeberl et al. | 705/1 |

(Continued)

FOREIGN PATENT DOCUMENTS

JP          2006276709 A     *   10/2006

*Primary Examiner* — Olusegun Goyea
(74) *Attorney, Agent, or Firm* — MH2 Technology Law Group LLP

(57) ABSTRACT

Systems and methods of a pay-for-use pricing plan for consumables associated with a machine. The systems and methods include a machine that can detect a use of a consumable by a consumer. The use can be an installation of the consumable in the machine or an actual use of the consumable in the machine. The machine can detect a charge associated with the use of the consumable. Further, the machine can prompt the consumer for a payment and receive the payment from the consumer. In embodiments, the consumer can have an updatable account associated with the consumable usage. The machine can send an indication of the payment or updated account information to a supplier of the consumable.

23 Claims, 4 Drawing Sheets

U.S. PATENT DOCUMENTS

| | | | |
|---|---|---|---|
| 2005/0175240 A1* | 8/2005 | Parry et al. | 382/182 |
| 2005/0206694 A1* | 9/2005 | Wadley | 347/85 |
| 2005/0220462 A1* | 10/2005 | Miyaji | 399/24 |
| 2005/0231758 A1* | 10/2005 | Reynolds | 358/1.15 |
| 2006/0190324 A1* | 8/2006 | Adkins et al. | 705/14 |
| 2006/0204250 A1* | 9/2006 | Ishihara et al. | 399/12 |
| 2006/0221387 A1* | 10/2006 | Swift et al. | 358/1.15 |
| 2006/0279588 A1* | 12/2006 | Yearworth et al. | 347/6 |
| 2006/0289081 A1* | 12/2006 | Nicodem et al. | 141/94 |
| 2007/0036559 A1* | 2/2007 | Thomas | 399/8 |
| 2007/0103716 A1* | 5/2007 | Shiraiwa et al. | 358/1.14 |
| 2007/0297815 A1* | 12/2007 | Takada | 399/12 |
| 2008/0007764 A1* | 1/2008 | Zhang et al. | 358/1.15 |
| 2008/0025734 A1* | 1/2008 | Kehoe et al. | 399/8 |
| 2008/0242736 A1* | 10/2008 | Fuisz | 514/770 |
| 2008/0242737 A1* | 10/2008 | Fuisz | 514/770 |
| 2009/0030837 A1* | 1/2009 | Knodt | 705/40 |
| 2009/0106125 A1* | 4/2009 | Rock et al. | 705/26 |
| 2009/0292627 A1* | 11/2009 | Kodimer et al. | 705/29 |
| 2010/0002039 A1* | 1/2010 | Kikuchi et al. | 347/19 |
| 2010/0013594 A1* | 1/2010 | Komine et al. | 340/5.8 |
| 2010/0284531 A1* | 11/2010 | Hohberger et al. | 380/22 |
| 2012/0044286 A1* | 2/2012 | Yearworth et al. | 347/6 |
| 2012/0076511 A1* | 3/2012 | Kim et al. | 399/12 |

* cited by examiner

PAY FOR USE AND ANTI COUNTERFEIT SYSTEM AND METHOD FOR INK CARTRIDGES AND OTHER CONSUMABLES

FIELD OF THE INVENTION

The present embodiments relate to the field of consumables, and more particularly to systems and methods for a pricing plan associated with the use of consumables.

BACKGROUND OF THE INVENTION

Imaging device suppliers often rely on consumables such as ink cartridges and other supplies as a considerable source of revenue and profit. Conventional business models for suppliers involve the sale of machines, such as printers, to consumers for a relatively low price, and the sale of the consumables, such as ink cartridges, to the consumers at a high profit margin. One reasoning behind the conventional model is that suppliers assume that consumers purchase consumables more often than the machines in which the consumables are used. That way, customers only pay once for the machine but recurrently pay for new consumables when depleted consumables need to be replaced.

Because of the high price and the low production cost of consumables, counterfeit versions of consumables can take away from the profits of legitimate suppliers. By manufacturing the consumables at about the same production cost as it takes the legitimate suppliers to manufacture, counterfeiters can sell consumables at a fraction of the price charged by suppliers and still remain profitable. Further, the counterfeiters can imitate the legitimate product by customizing the counterfeit consumables for use in various machines sold by various suppliers.

The Internet and other outlets can provide a marketplace for counterfeiters to sell and consumers to buy counterfeited products. Some consumers can be drawn to purchasing counterfeit consumables because of the lower price and because the quality can be at least serviceable. Other customers may not know that they are purchasing counterfeit products. Some counterfeiters manufacture products and market the products only slightly below the price of that of the legitimate suppliers' products in an attempt to pass off the counterfeit products as those of the genuine supplier. In these cases, not only do the counterfeit consumables impact the legitimate suppliers' profits, but the suppliers are also concerned that the lower quality of the counterfeit products can damage the suppliers' reputations.

As a result of counterfeit consumables entering the market, some legitimate suppliers are putting forth efforts to combat the problem. For example, some suppliers are forming teams of investigators to analyze suspect consumables and packaging, and take findings to law enforcement operations. However, this approach can be costly and unsuccessful. Further, the successful shutdown of one counterfeit operation may not deter other operations from originating or existing operations formulating more intricate operations.

A need, therefore, exists to implement systems and methods to replace existing delivery and use systems and methods associated with consumables. Further, it is desirable to implement systems and methods to provide or eliminate the incentives of counterfeiting operations.

SUMMARY OF THE EMBODIMENTS

The following presents a simplified summary in order to provide a basic understanding of some aspects of one or more embodiments. This summary is not an extensive overview, nor is it intended to identify key or critical elements of the embodiments nor to delineate the scope of the embodiments. Rather, its primary purpose is merely to present one or more concepts in simplified form as a prelude to the detailed description presented later.

In accordance with the present teachings, a method of charging for a use of a consumable is provided. The method comprises providing a consumable to a consumer for use in a machine, and receiving an indication of a use of the consumable in the machine by the consumer. An account of the consumer is updated to reflect a charge associated with the use of the consumable.

In accordance with the present teachings, a method of charging for a use of a consumable is provided. The method comprises detecting a use of a consumable associated with a machine by a consumer, and detecting a charge associated with the use of the consumable. An account associated with the consumer is updated to reflect the charge associated with the use of the consumable.

In accordance with the present teachings, a system for charging for a use of a consumable is provided. The system comprises a memory configured to store account information associated with a consumer, and a processor coupled to the memory. The processor is configured to detect a use of a consumable associated with a machine by a consumer, detect a charge associated with the use of the consumable, and update the account information associated with the consumer to reflect the charge associated with the use of the consumable.

BRIEF DESCRIPTION OF THE DRAWINGS

The accompanying drawings, which are incorporated in and constitute a part of this specification, illustrate embodiments and together with the description, serve to explain the principles of the embodiments. In the figures.

Figure 1:
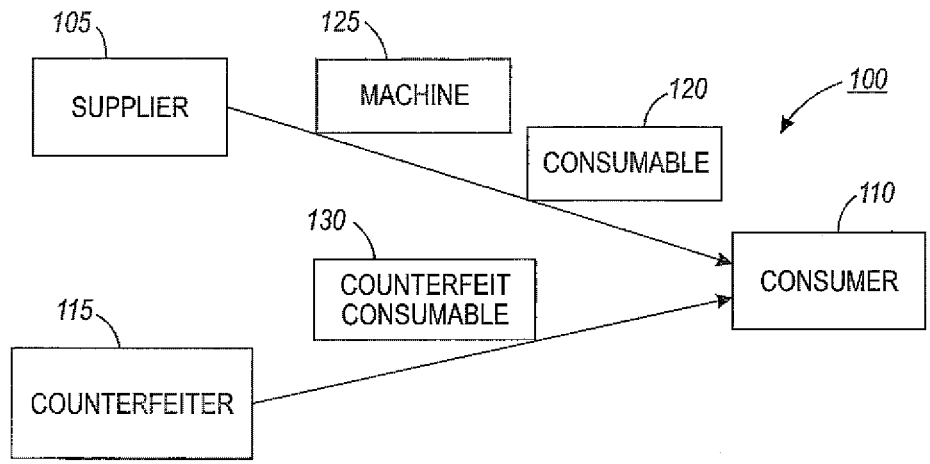
FIG. 1 depicts an exemplary relationship among a supplier, a consumer, and a counterfeiter according to the present embodiments.

It should be noted that some details of the drawings have been simplified and are drawn to facilitate understanding of the inventive embodiments rather than to maintain strict structural accuracy, detail, and scale.

DESCRIPTION OF THE EMBODIMENTS

Reference will now be made in detail to the present and exemplary embodiments, examples of which are illustrated in the accompanying drawings. Wherever possible, the same reference numbers will be used throughout the drawings to refer to the same or like parts.

Various embodiments provide systems and methods that allow a pricing plan associated with the use of consumables. In particular, the systems and methods relate to charging consumers an amount for the use of the consumables in associated machines.

As used herein, a consumer is a person or entity that purchases or receives products or goods from a supplier or similar distributor. Further, as used herein, consumables can be products that consumers buy recurrently. In addition, consumables can refer to anything that is capable of being consumed, such as by destroying, dissipating, wasting, spending, and/or the like. For example, in certain embodiments of the present systems and methods, consumables can refer to toner cartridges, ink cartridges, and similar printing cartridges for use in imaging devices. Further, as used herein, machines can refer to any products in which the consumable is used. For example, in certain embodiments of the present systems and methods, machines can refer to ink jet printers, laser printers, and other imaging devices in which the consumables can be used. However, it should be appreciated that consumables and machines as described in the present embodiments can refer to products and machines not relating to imaging devices.

As used herein, a counterfeit consumable is a product that attempts to imitate and undermine the established worth of a legitimate product. Counterfeiters can attempt to deceive a consumer into thinking that they are purchasing a legitimate product. For example, a counterfeiter can attempt deceive a consumer by marketing a counterfeit product as the legitimate product. For further example, a counterfeiter can sell consumables slightly below the cost of the legitimate product in attempt to deceive the consumer. Further, counterfeiters can attempt to convince the consumer that they could deceive others with the imitation product, or sell a consumer a generic product for a lower price than the legitimate item. The manufacture and sale of counterfeit products can result in infringement of patents and/or trademarks associated with the legitimate product and/or suppliers or distributors of the legitimate product.

As used herein, suppliers can refer to any entity that manufactures legitimate consumables to be used in machines. In some cases, the suppliers can also manufacture the machines. For example, a supplier can manufacture ink jet printers as well as the ink cartridges that are used in the ink jet printers. In embodiments, the consumables manufactured by the suppliers can be patented or trademarked, or otherwise specifically manufactured for use in a particular machine, such as a particularly sized and shaped ink cartridge.

Suppliers of consumables can charge a relatively low price for a machine because consumers often retain the machine for use over a long period. Further, the suppliers can charge a relatively high price for the consumables that are used in the machine because consumers repurchase replacement consumables over the life of the machine. Because consumables can have a low production cost associated with manufacturing the consumables, profit margins on the sale of the machines can be lower than that on the sale of the consumables. It should be understood, however, that the systems and methods as described herein can be employed in any pricing plan or business model.

Because of the low production cost and the high price of consumables, counterfeiters can find profitable the sale of counterfeit products at a price point lower than that charged for legitimate products by suppliers. As such, counterfeit consumables can be a source of lost profit for a supplier because consumers can spend money on counterfeit products instead of legitimate products sold by the supplier. Further, low quality, counterfeit products that attempt to imitate a legitimate product can damage the reputation of the supplier. For example, a consumer who thinks they have purchased a legitimate product but have instead purchased a counterfeit product can be dissatisfied with the counterfeit product and can therefore have a negative perception of the supplier.

Existing attempts to curtail counterfeiting have involved shutting down and/or prosecuting counterfeiting operations. For example, suppliers can spend money hiring teams of investigators, setting up forensic labs to analyze suspect consumables, and dealing with law enforcement officials in prosecuting the operations. However, these attempts can be both expensive and time consuming, and can ultimately not alleviate the problem because other counterfeit operations can surface to replace those that are suppressed. It is therefore desirable to implement systems and methods which remove the incentives for manufacturing and selling counterfeit consumables.

In the present embodiments, systems and methods implementing a pricing plan associated with the distribution and use of consumables are provided. In particular, the pricing plan relates to charging consumers a relatively low amount for purchasing consumables, and an additional amount for the use of the consumables. For example, a supplier can charge $5 for an ink cartridge that it could normally sell for $30 in conventional pricing plans. However, in the proposed pricing plan, the supplier can charge an additional amount for the actual use of the consumable. For example, the supplier can charge a $25 fee for inserting the ink cartridge into an imaging device, or can charge $1 for every 50 mL of ink used in the ink cartridge. As a result of the proposed pricing plan, the incentive for counterfeiters to produce counterfeit goods can be reduced because the sale price of legitimate consumables and counterfeit consumables could be about the same. Therefore, consumers could be more likely to buy the legitimate product from the supplier and because counterfeiters could find it harder to undercharge the supplier.

Referring to FIG. 1, depicted is an exemplary relationship 100 among a supplier 105, a consumer 110, and a counterfeiter 115. The supplier 105 can be any entity that manufactures a consumable 120 to be used in a machine 125 or other product of manufacture. In some cases, the supplier 105 can also manufacture the machine 125. The supplier 105 can sell the consumable 120 and the machine 125 to the consumer 110. In embodiments, a third party can manufacture and/or sell the machine 125 to the consumer 110.

The consumable 120 can be a product that the consumer 110 buys from the supplier 105 recurrently. For example, in certain embodiments, the consumable 120 can refer to toner cartridges, ink cartridges, and other similar cartridges used in imaging devices. Further, in certain embodiments, the machine 125 can refer to the product in which the consumable is used such as, for example, an ink jet printer, a laser printer, and other similar imaging devices. However, it should be appreciated that the consumable 120 and machine 125 can refer to products and machines not relating to imaging devices. In embodiments, the consumable 120 manufactured by the supplier 105 can be patented or trademarked. Further, the consumable 120 can be manufactured specifically for use in the machine 125, for example as a particularly sized and shaped ink cartridge, such that the consumable 120 cannot be used in machines manufacture by other suppliers.

The counterfeiter 115 can be any entity that can manufacture a counterfeit consumable 130 that can attempt to imitate and undermine of the established worth of the consumable 120 from the supplier 105. The counterfeiter 115 can sell the counterfeit consumable 130 to the consumer 110 in an attempt to deceive the consumer 110 into thinking that the consumer 110 is purchasing the consumable 120. For example, the counterfeiter 115 can deceive the consumer 110 by marketing the counterfeit consumable 130 as the legitimate consumable 120. For further example, the counterfeiter 115 can sell the counterfeit consumable 130 slightly below the cost of the consumable 120.

Further, the counterfeiter 115 can attempt to convince the consumer 110 that the consumer 110 could deceive others with the counterfeit consumable 130. Further, the counterfeiter 115 can sell the counterfeit consumable 130 at a lower price than the supplier 105 sells the consumable 120, thus potentially making the counterfeit consumable 130 more attractive to the consumer 110. The manufacture and sale of the counterfeit consumable 130 can result in infringement of the patents and/or trademarks associated with the consumable 120, and possessed by the supplier 105 or a licensor of the supplier 105. The counterfeit consumable 130 can attempt to duplicate the size, shape, appearance, and the like of the consumable 120 such that the counterfeit consumable 130 can be used in the machine 125.

Figure 2:
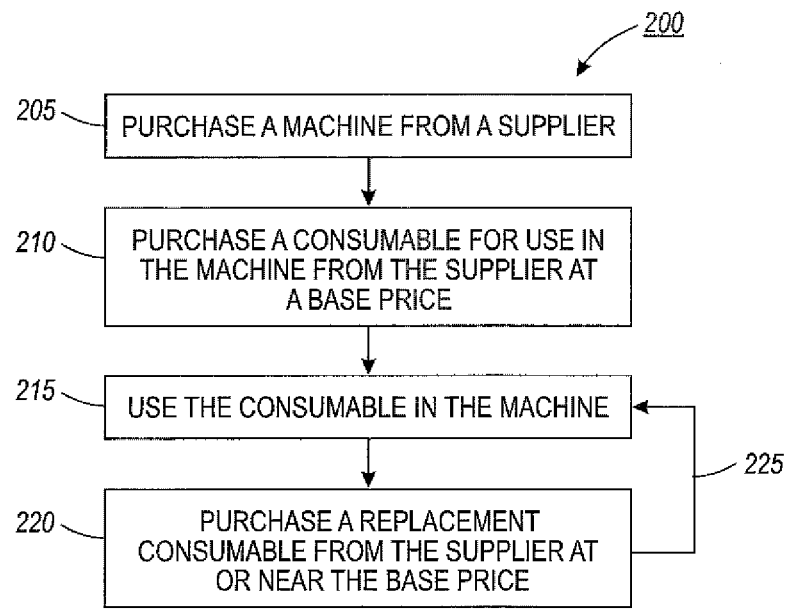
FIG. 2 depicts a flow diagram for a conventional pricing plan according to embodiments.

Referring to FIG. 2, depicted is a flow diagram for a conventional pricing plan 200 involving the sale of a machine and consumables to a consumer. In 205, a consumer can purchase a machine from a supplier. For example, the consumer can purchase an ink jet printer from an ink jet printer manufacturer. In embodiments, the consumer can purchase the machine from a third party other than the supplier. The supplier can charge the consumer a relatively low price for the machine, such as, for example, a price at or near the production cost of the machine. However, the price charged for the machine by the supplier can be different amounts.

In 210, the consumer can purchase a consumable for use in the machine from the supplier at a base price. In embodiments, the base price can be a relatively high price, such as, for example, a price above the production cost of the consumable that can afford the supplier a high profit margin. The reasoning for the relatively high base price is that consumers can continually repurchase replacement consumables as purchased consumables are used up or depleted through machine operation. Once the consumer purchases the consumable, there can be no charge for the consumer to use the consumable in the machine.

In 215, the consumer can use the consumable in the machine. For example, the consumer can use an ink cartridge that is loaded into an ink jet printer when printing a document. In 220, the consumer can purchase a replacement consumable for the machine at or near the base price. For example, the consumer can purchase a new ink cartridge to replace another ink cartridge depleted through machine operation. In embodiments, the price of the replacement consumable can be the same as that of the original consumable, but can also fluctuate. In 225, the consumer can use the replacement consumable in the machine, and repeat the purchase/use cycle as necessary. In the pricing plan 200 described in FIG. 2, the supplier can achieve profit through the sell of consumables and replacement consumables because the price of the consumables and the replacement consumables can be significantly above the production cost to the supplier.

Figure 3:
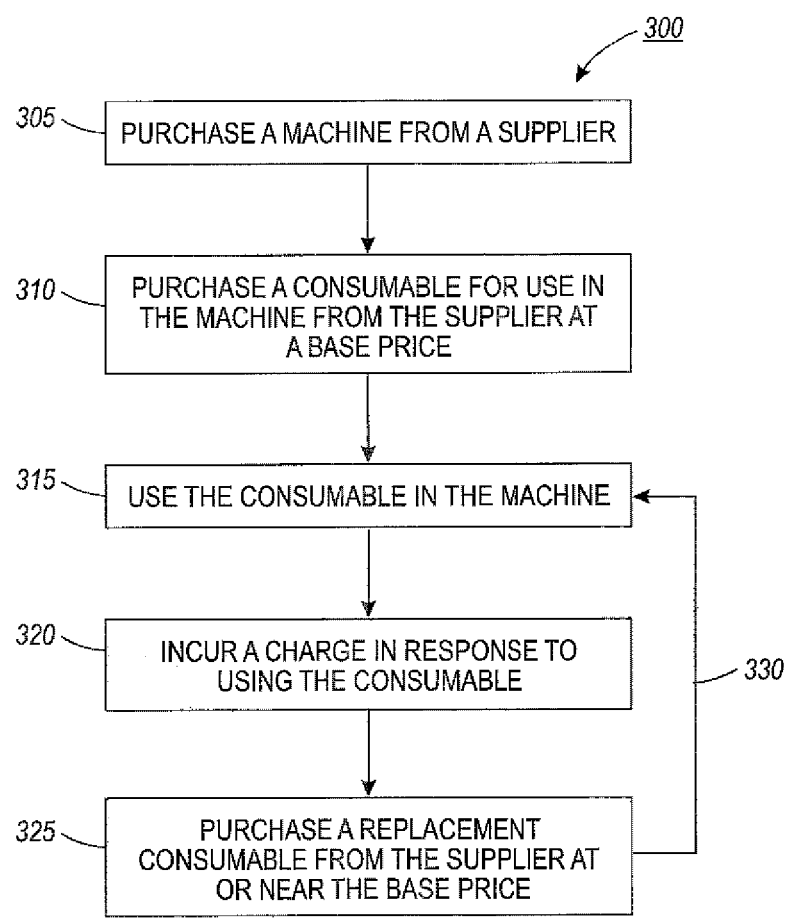
FIG. 3 depicts a flow diagram for a pay-for-use pricing plan according to the present embodiments.

Referring to FIG. 3, depicted is a flow diagram for a pay-for-use pricing plan 300 according to the present embodiments. In particular, the pricing plan 300 involves charging the consumer for the use of a consumable after the consumable is purchased. In 305, a consumer can purchase a machine from a supplier. For example, the consumer can purchase an ink jet printer from an ink jet printer manufacturer. In embodiments, the consumer can purchase the machine from a third party other than the supplier. The supplier can charge the consumer a relatively low price for the machine, such as, for example, a price at or near the production cost of the machine. However, the price charged for the machine by the supplier can be different amounts. In 310, the consumer can purchase a consumable from the supplier at a base price. In embodiments, the base price can be a relatively low price, such as, for example, a price at or near the production cost of the consumable.

In 315, the consumer can use the consumable in the machine. For example, the use of the consumable can be an installation of the consumable into the machine, such as installing an ink cartridge into an imaging device. In embodiments, the installation can be done by the purchaser of the consumable, by a service person, or by any other person, machine, or entity. For further example, the use of the consumable can be an expending of the consumable in the machine after the consumable is installed, such as expending an ink cartridge that is loaded into an ink jet printer when printing a document.

In 320, the consumer can incur a charge in response to using the consumable in the machine. In embodiments, a flat fee charge can be levied to the consumer or to an account associated with the consumer upon installation of the consumable. In other embodiments, a meter associated with the machine can levy a charge to the consumer or to an account associated with the consumer on a per-use basis, such as, for example, when the consumer expends the consumable in printing a document. It should be appreciated that other systems and methods can be used to levy the charge to the consumer. In embodiments, conventional point of sale transactions can be utilized and can involve cash, credit cards, debit cards, checks, identification numbers, PIN numbers, and the like.

In 325, the user can purchase a replacement consumable for the machine at or near the base price. For example, the consumer can purchase a new ink cartridge to replace another ink cartridge depleted through machine operation. In embodiments, the price of the replacement consumable can be the same as that of the original consumable, but can also fluctuate. In 330, the user can use the replacement consumable in the machine, and repeat the purchase/use cycle as necessary. In the pricing plan 300 described in FIG. 3, the supplier can achieve profit through charging for the use of the consumables and replacement consumables. Further, the incentive for counterfeiters can be reduced because the price for legitimate consumables can be at or near that of counterfeit consumables. Still further, even if counterfeit consumables are used in the machine, the legitimate supplier can collect the insertion charge upon use of the consumable, which can further reduce the incentive for counterfeiters to make and consumers to purchase counterfeit consumables.

Figure 4:
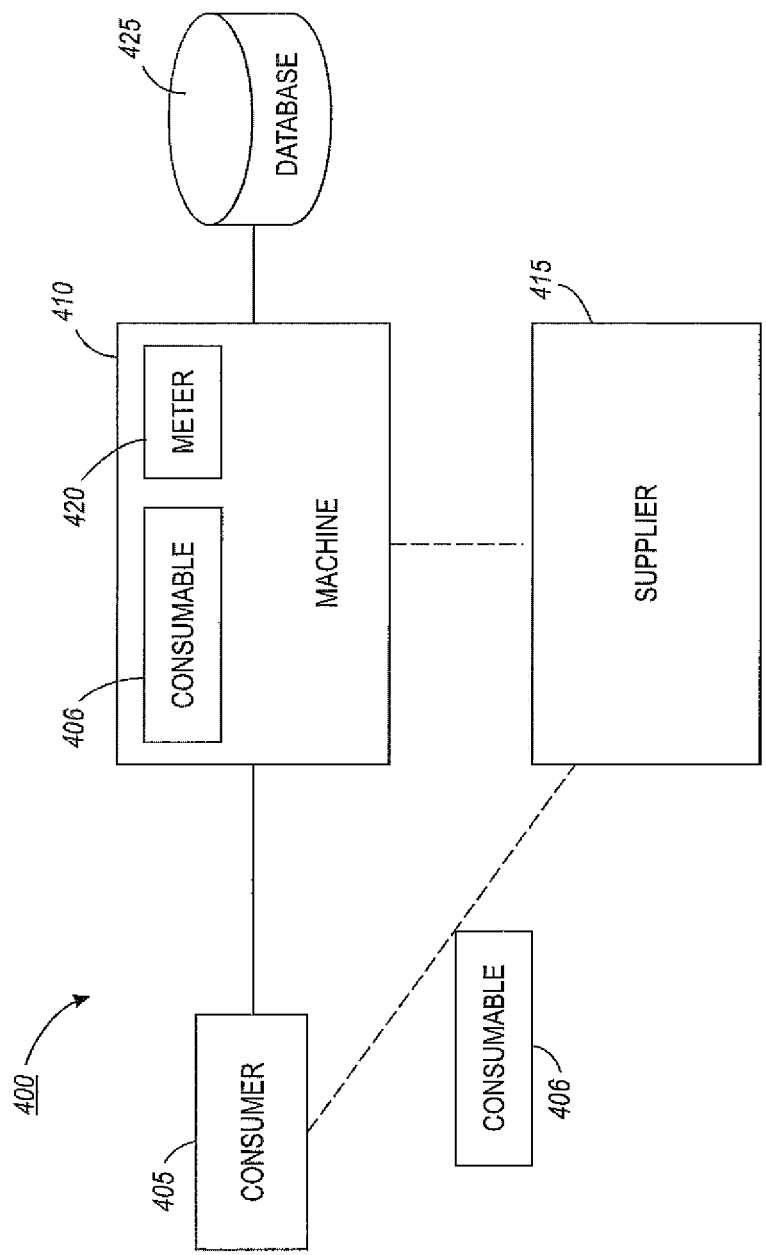
FIG. 4 depicts an exemplary pay-for-use charging system and method according to the present embodiments.

Referring to FIG. 4, an exemplary charging system and method 400 is depicted. The charging system and method 400 can be implemented to charge a consumer for the use of a consumable, as described herein with respect to FIG. 3. As shown in FIG. 4, a consumer 405 can purchase a consumable 406 from a supplier 415 for use in a machine 410. For example, a consumer 405 can purchase an ink cartridge from an imaging device manufacturer for use in an ink jet printer.

The machine 410 can comprise a meter 420 that can levy a charge to the consumer 405 for use of the consumable 406 in the machine 410. The meter 420 can comprise an associated monitor, touchscreen, or similar display device to display an amount of the consumable used, a price structure, an amount charged to the consumer 405, account and balance information, and the like. In embodiments, the meter 420 can accept cash, credit cards, debit cards, checks, identification numbers, PIN numbers, and any other form of payment from the consumer 405. The meter 420 can charge the consumer 405 a flat fee upon an installation of the consumable 406 in the machine. In embodiments, the meter 420 can charge the consumer 405 based on the amount of the consumable 406 used, or the amount of other resources used in association with the consumable 406 such as, for example, the number of printed pages. Further, the meter 420 can charge the consumer 405 at a periodic rate or based on the amount of time the consumer 405 uses the machine 410 and/or consumable 406. However, it should be appreciated that other charging systems and methods can be implemented.

In embodiments, the meter 420 can accept a security code from the consumer 405 that is linked to an account associated with the consumer 405. The meter 420 can lock the machine 410 in the absence of a security code entry or if an incorrect security code is entered. The machine 410 and/or meter 420 can have a memory, processor, and other computing components necessary to monitor and track the installation of the consumable 406, and the usage of the machine 410 and consumable 406. For example, the machine 410 and/or meter 420 can have a local storage device such as a hard drive or a database 425, or can connect to a remote storage device such as a remote database or server. Further, the meter 420 can maintain account balance information associated with the consumer 405. For example, the meter 420 can appropriately deduct or add to a balance associated with the consumer 405 based on payments from, installation of the consumable 406 in the machine 410, and/or usage of the machine 410 by the consumer 405.

Further, in embodiments, the machine 410 can be connected to the supplier 415 via the Internet, a LAN, a wireless communication network, or any other type of communication network. The machine 410 can be configured to provide account information associated with the consumer 405 to the supplier 415. For example, the machine 410 can provide updated account balances based on payments from, installation of the consumable 406 in the machine 410, and/or usage of the machine 410 and/or the consumable 406 by the consumer 405.

In embodiments, the machine 410 can send a notification of an installation or a usage of the consumable 406 and any relevant account or usage data directly to the supplier 415 via a communication network. The supplier 415 can comprise an accounting system for monitoring and updating the account information. Further, the supplier 415 can comprise a billing system to send bills to the consumer 405 for associated use of the consumable 406 in the machine 410. In embodiments, the billing system can be set up to bill the consumer 405 via conventional methods, such as, for example, automatic bills on a periodic basis.

Other billing systems and methods are also contemplated. For example, a consumable installation charge can be added to the cost of servicing an associated machine. For example, whenever a machine is serviced, an appropriate amount can be added to a service bill for the installation of a consumable. In embodiments, the amount added can be directly related to the amount of consumable used, or can be a flat fee based on the installation.

It should be understood that other charging and billing systems and methods can be implemented in the present systems and methods. For example, the systems and methods can implement security codes, smart cards, PINs, and other forms of identification to be used in association with a billing account or the like. Further, a supplier can provide a security release code to a consumer when the consumer keeps an associated account up to date. If no security release code is entered into the machine, the machine can lock. Still further, the accounting, billing, and associated account information can be automatically or manually maintained by the machine, the supplier, a third party, or via a web-based method.

Figure 5:
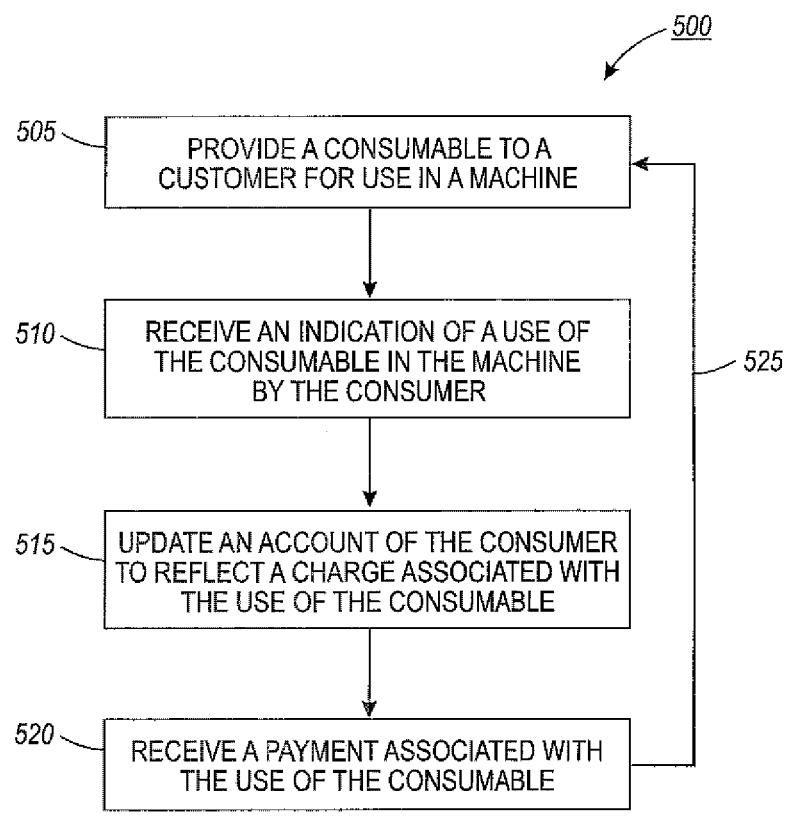
FIG. 5 depicts a flow diagram for a pay-for-use pricing plan according to the present embodiments.

Referring to FIG. 5, depicted is a flow diagram for a pay-for-use pricing plan 500 according to the present embodiments. In particular, the pricing plan 500 involves a supplier charging a consumer for the use of a consumable. In 505, a supplier can provide a consumable to a customer for use in a machine. For example, the consumer can purchase the consumable directly or indirectly from the supplier. In 510, the supplier can receive an indication of a use of the consumable in the machine by the consumer. For example, an ink cartridge can be installed in an imaging device. For further example, an imaging device can provide an indication of a printing of a document and an associated use of an ink cartridge to the supplier.

In 515, the supplier can update an account of the consumer to reflect a charge associated with the use of the consumable. For example, a flat fee can be assessed for the installation of an ink cartridge, and the account of the consumer can be updated to reflect the flat fee. In embodiments, the supplier can determine how much of the ink cartridge was used in printing a document, and an associated cost of the ink cartridge use. In 520, the supplier can receive a payment from the consumer associated with the use of the consumable, in accordance with the systems and methods described herein. In embodiments, the supplier can bill the consumer based on the updated account of the consumer. In 525, the supplier can provide a replacement consumable to the customer, and the provide/use cycle can repeat as necessary.

The numerical ranges and parameters setting forth the broad scope of the embodiments are merely exemplary, and can fluctuate based on the systems and methods described herein. Further, while the embodiments have been illustrated with respect to one or more implementations, alterations and/or modifications can be made to the illustrated examples without departing from the spirit and scope of the appended claims. In addition, while a particular feature of the embodiments may have been disclosed with respect to only one of several implementations, such feature may be combined with one or more other features of the other implementations as may be desired and advantageous for any given or particular function. Furthermore, to the extent that the terms "including," "includes," "having," "has," "with," or variants thereof are used in either the detailed description and the claims, such terms are intended to be inclusive in a manner similar to the term "comprising." The term "at least one" of is used to mean one or more of the listed items can be selected. The term "about" indicates that the value listed may be somewhat altered, as long as the alteration does not result in nonconformance of the process or structure to the illustrated embodiment. Finally, "exemplary" indicates the description is used as an example, rather than implying that it is an ideal. Other embodiments will be apparent to those skilled in the art from consideration of the specification and practice of the embodiments disclosed herein. It is intended that the specification and examples be considered as exemplary only, with a true scope and spirit of the embodiments being indicated by the following claims.

What is claimed is:

1. A method of charging for a use of a consumable, the method comprising:
setting a base price of a consumable to be at most a production cost of the consumable, wherein the consumable is not a counterfeit consumable;
providing the consumable at the base price of the consumable to a consumer for use in a machine;
receiving an indication of a use of the consumable in the machine by the consumer;

receiving an indication of an amount of the consumable used;

updating, using one or more processors, an account of the consumer to reflect a first per-use charge based on the amount of the consumable used and a per-use rate for the machine;

receiving an indication of a use of a counterfeit consumable in the machine by the consumer;

receiving an indication of an amount of the counterfeit consumable used; and updating the account of the consumer to reflect a second per-use charge based on the amount of the counterfeit consumable used and per-use rate of the machine.

2. The method of claim 1, further comprising;
receiving an indication of a payment associated with one or more of the use of the consumable and the use of the counterfeit consumable; and
updating the account of the consumer to reflect the payment.

3. The method of claim 1, wherein the use of the consumable is an installation of the consumable into the machine.

4. The method of claim 1, further comprising billing the consumer based on the account of the consumer.

5. The method of claim 1, further comprising:
receiving an indication that one or more of the consumable and the counterfeit consumable is depleted; and
selling an additional consumable at a base price of the additional consumable to the consumer in response to the indication that one or more of the consumable and the counterfeit consumable is depleted.

6. The method of claim 1, wherein the indication of the use of the consumable is received from the machine via a communication network.

7. The method of claim 1, wherein the consumable is a cartridge and the machine is an imaging device.

8. The method of claim 1, further comprising;
receiving an indication of a service of the machine; and
updating the account of the consumer to reflect a charge based on the service of the machine.

9. A method of charging for a use of a consumable, the method comprising:
detecting, using one or more processors, a use of a counterfeit consumable by a machine of a consumer, wherein the machine is associated with a consumable supplier that did not supply the counterfeit consumable;
detecting an amount of the counterfeit consumable used;
updating an account associated with the consumer to reflect a per-use charge based on the amount of the counterfeit consumable used and a per-use rate of the machine that is equivalent to a per-use rate associated with using a legitimate consumable, wherein the account is further associated with the consumable supplier; and
sending information associated with the account to the consumable supplier.

10. The method of claim 9, further comprising:
receiving an indication of a payment associated with the use of the counterfeit consumable; and
updating the account associated with the consumer to reflect the payment.

11. The method of claim 9, wherein the use of the counterfeit consumable is an installation of the counterfeit consumable into the machine.

12. The method of claim 9, further comprising:
detecting that the counterfeit consumable is depleted; and
providing a notification to the consumable supplier based on detecting that the counterfeit consumable is depleted.

13. The method of claim 9, wherein the information associated with the account is sent to the consumable supplier via a communication network.

14. The method of claim 9, wherein the counterfeit consumable is a cartridge and the machine is an imaging device.

15. The method of claim 10, wherein the payment associated with the use of the counterfeit consumable is through one or more of cash, credit card, debit card, check and PIN entry.

16. A system for charging for a use of a consumable, the system comprising:
a memory configured to store account information associated with a consumer; and
a processor coupled to the memory and configured to perform operations comprising:
setting a base price of a consumable to be at most a production cost of the consumable, wherein the consumable is not a counterfeit consumable;
providing the consumable at the base price of the consumable to the consumer for use in a machine;
receiving an indication of a use of the consumable in the machine by the consumer;
receiving an indication of an amount of the consumable used;
updating, the account information associated with the consumer to reflect a first per-use charge based on the amount of the consumable used and a per-use rate for the machine;
receiving an indication of a use ref a counterfeit consumable in the machine by the consumer;
receiving an indication of an amount of the counterfeit consumable used; and
updating the account information associated with the consumer to reflect a second per-use charge based on the amount of the counterfeit consumable used and the per-use rate of the machine.

17. The system of claim 16, wherein the processor is further configured to:
receive an indication of a payment associated with one or more of the use of the consumable and the use of the counterfeit consumable; and
update the account information associated with the consumer to reflect the payment.

18. The system of claim 16, wherein the use of the consumable is an installation of the consumable into the machine.

19. The system of claim 16, wherein the processor is further configured to
detect that one or more of the consumable and the counterfeit consumable is depleted; and
provide a notification to the consumable supplier based on detecting that one or more of the consumable and the counterfeit consumable is depleted.

20. The system of claim 16, wherein the account information associated with the consumer is sent to the consumable supplier via a communication network.

21. The system of claim 16 wherein the consumable is a cartridge and the machine is an imaging device.

22. The system of claim 16 wherein the processor is further configured to detect a service of the machine, and update the account information associated with the consumer to reflect a charge based on the service of the machine.

23. The system of claim 17, wherein the payment associated with the use of the consumable is through one or more of cash, credit card, debit card, check and PIN entry.

* * * * *